(No Model.)
J. V. HARTER.
GROUND PULVERIZER AND STALK CUTTER.
No. 282,724. Patented Aug. 7, 1883.
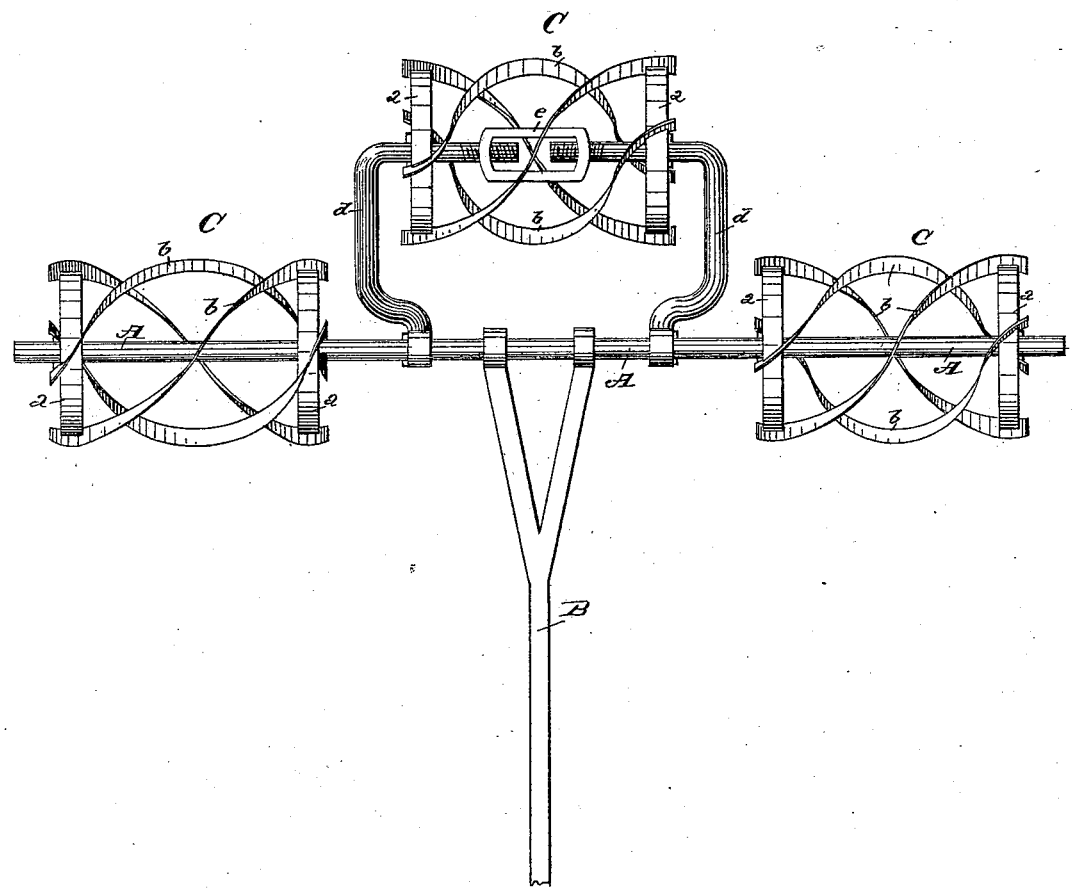
WITNESSES:
INVENTOR:
J. V. Harter
BY Munn & Co.
ATTORNEYS.

UNITED STATES PATENT OFFICE.

JOSEPH V. HARTER, OF DENVER, ILLINOIS.

GROUND-PULVERIZER AND STALK-CUTTER.

SPECIFICATION forming part of Letters Patent No. 282,724, dated August 7, 1883.

Application filed June 21, 1882. Renewed June 9, 1883. (No model.)

*To all whom it may concern:*

Be it known that I, JOSEPH V. HARTER, of Denver, in the county of Hancock and State of Illinois, have invented a new and Improved Ground-Pulverizer and Stalk-Cutter, of which the following is a full, clear, and exact description.

The object of the invention is to improve combined ground-pulverizers and stalk-cutters by the combination hereinafter described.

Reference is to be had to the accompanying drawing, which is a plan view of my improved machine.

A is a rod or shaft of suitable size and length, at the center of which is attached the draft-pole B. Upon the ends of the shaft A are the revolving cutters or pulverizers C, consisting each of circular heads $a$ $a$, to which are attached the spiral blades or knives $b$. These radial cutters revolve freely upon the shaft A, and are retained in place by pins, collars, or other equivalent devices.

Upon the shaft A are hung two arms, $d$ $d$, extending to the rear, and carrying a third revolving cutter of the same construction as those just described. The arms $d$ are bent inward at their outer end to form bearings for the heads of the rear cutter, and the ends of the arms are connected by a turn-buckle, $e$, so that this cutter may be readily removed. The arms $d$ $d$ move freely upon the shaft A, so as to allow the cutter to rise and fall, and to allow the machine to adapt itself to inequalities of the ground.

When the apparatus is drawn forward, the rotary cutters are revolved by contact with the ground, and the blades $b$ act to cut or chop the stalks, or in the same manner to pulverize the ground and level the same as required. The cutters are in position to act upon different rows, so that three rows can be operated upon at once.

To use the apparatus as a ground-roller the cutters will be boxed so that they form rollers.

This apparatus is inexpensive and of durable construction. The blades of the cutters can be readily removed for sharpening, or replaced by others when broken.

Having thus described my invention, I claim as new and desire to secure by Letters Patent—

1. In a stalk-cutter or pulverizer, the combination, with the shaft A and pole B, of the arms $d$ $d$, pivoted at one end to said shaft, bent to form journals for heads, and provided on their opposite threaded ends with a turn-buckle $e$, as and for the purpose specified.

2. In a stalk-cutter and ground-pulverizer, the combination, with the shaft A, pole B, and a cutter, C, fitted for rotation upon each end of said shaft, of the bent pivoted arms $d$ $d$, carrying an intermediate cutter, substantially as described.

JOSEPH V. HARTER.

Witnesses:
 M. L. CLARK,
 E. McCLURE.